US010062284B2

(12) United States Patent
Zhang

(10) Patent No.: US 10,062,284 B2
(45) Date of Patent: Aug. 28, 2018

(54) PARKING SPACE DETECTION APPARATUS AND METHOD, ELECTRONIC APPARATUS

(71) Applicant: FUJITSU LIMITED, Kawasaki (JP)

(72) Inventor: Guocheng Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 15/336,047

(22) Filed: Oct. 27, 2016

(65) Prior Publication Data

US 2017/0116858 A1 Apr. 27, 2017

(30) Foreign Application Priority Data

Oct. 27, 2015 (CN) .......................... 2015 1 0705589

(51) Int. Cl.
| | |
|---|---|
| *H04N 7/18* | (2006.01) |
| *G08G 1/14* | (2006.01) |
| *G06K 9/00* | (2006.01) |
| *G06K 9/62* | (2006.01) |
| *G06K 9/66* | (2006.01) |
| *G06T 5/00* | (2006.01) |

(Continued)

(52) U.S. Cl.
CPC .......... *G08G 1/14* (2013.01); *G06K 9/00771* (2013.01); *G06K 9/00785* (2013.01); *G06K 9/00812* (2013.01); *G06K 9/6202* (2013.01); *G06K 9/66* (2013.01); *G06T 5/002* (2013.01); *G06T 7/248* (2017.01); *G06T 7/292* (2017.01); *H04N 7/181* (2013.01); *G06T 2207/10016* (2013.01); *G06T 2207/30264* (2013.01)

(58) Field of Classification Search
CPC ........... G08G 1/14; G06T 5/002; G06T 7/248; G06T 7/292; G06T 2207/30264; G06T 2207/10016; H04N 7/181; G06K 9/00812; G06K 9/00785; G06K 9/6202; G06K 9/00771; G06K 9/66
USPC ........................................................ 348/149
See application file for complete search history.

(56) References Cited

U.S. PATENT DOCUMENTS

| | | | |
|---|---|---|---|
| 2013/0265428 A1* | 10/2013 | Yoon .................. | G06K 9/00812 348/148 |
| 2014/0112542 A1* | 4/2014 | Choi .................. | G06K 9/00812 382/104 |

(Continued)

OTHER PUBLICATIONS

Extended European Search Report dated Mar. 22, 2017 in European Patent Application No. 16195021.7.

*Primary Examiner* — Allen C Wong
(74) *Attorney, Agent, or Firm* — Staas & Halsey LLP

(57) ABSTRACT

Embodiments of the present disclosure provide a parking space detection apparatus and method, medium and electronic equipment, in which detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high; and furthermore, performing the detection based on the stable image may suppress random noises, and improve the detection precision.

12 Claims, 7 Drawing Sheets

(51) Int. Cl.
*G06T 7/246* (2017.01)
*G06T 7/292* (2017.01)

(56) References Cited

U.S. PATENT DOCUMENTS

2015/0086071 A1 3/2015 Wu et al.
2015/0117705 A1 4/2015 Zhang et al.

* cited by examiner

PARKING SPACE DETECTION APPARATUS AND METHOD, ELECTRONIC APPARATUS

CROSS-REFERENCE TO RELATED APPLICATIONS

This application claims the priority benefit of Chinese Patent Application No. 201510705589.X, filed on Oct. 27, 2015 in the Chinese Intellectual Property Office, the disclosure of which is incorporated herein in its entirety by reference.

BACKGROUND

1. Field

The present disclosure relates to the field of information technologies, and in particular to a parking space detection apparatus and method, medium and electronic equipment.

2. Description of the Related Art

As the development of social economics, the number of vehicles increases more and more. In cities of high cost of land, parking has been a problem besetting people, who desire to quickly obtain information on parking spaces of neighboring parking lots. Likewise, for the parking lot administrators, they also need to learn information on parking spaces of the parking lots all the time, to efficiently control entrance and exit of vehicles, and share the information with the drivers. Furthermore, for some large-scale parking lots, due to defects of designs, some regions are jammed, while some other regions have plenty of available parking spaces. The drivers need to spend much effort to find available parking spaces, and at this moment, the drivers are also extremely desirable to be given real-time information on the parking spaces of each region of the parking lots. And it is obvious that collection of such real-time information cannot be achieved manually.

As the progress of sciences and technologies, more and more technologies are developed to be used for detection of parking space statuses of fixed parking spaces, such as mounting a probe radar over each parking space, and counting at entrances and exits. However, costs of such methods are relatively high.

In recent years, image processing technologies are also applied to detection of statuses of parking spaces, in which one video camera may cover many parking spaces in comparison with many previous technologies, which makes the needed costs greatly lowered. In existing parking space detection methods, contour methods or machine learning methods are usually adopted.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

However, it was found by the inventors that when the above existing contour methods are adopted, although the contour methods are applicable to various scenarios of angles of view, efficient detection cannot be performed once a parking space has a plenty of details or relatively more obstructions. And when the above existing machine learning methods are adopted, although the machine learning methods are able to process the details relatively well, they have relatively high requirements on angles of view, and at the same time, the performance of the machine learning methods is much dependent on good or bad of a training result, and a detection result is relative poor in cases of low contrast and low illumination. And changes of video images resulted from changes of light of scenarios, such as daylight, sunlight, night, lamp light, etc., will affect precision of detection. Furthermore, movement of pedestrians and vehicles will also greatly affect stability of the detection.

Embodiments of the present disclosure provide a parking space detection apparatus and method, electronic equipment, in which detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high; and furthermore, performing the detection based on a stable image may suppress random noises, and improve the detection precision.

According to a first aspect of embodiments of the present disclosure, there is provided a parking space detection apparatus, which detects monitoring videos of a parking lot one by one taking images of a predefined number of frames as a unit, the apparatus including: a first detecting unit configured to, in detecting each image of a predefined number of frames, for a parking space having motion information within a current predefined number of frames, determine a detection result of the parking space as a detection result of the parking space of a previous predefined number of frames; and a second detecting unit configured to, in detecting each image of a predefined number of frames, detect images one by one of a parking space having no motion information within the current predefined number of frames; wherein, the second detecting unit includes: a comparing unit configured to, in detecting each image of the parking space having no motion information within the current predefined number of frames, compare a stable image of the parking space of the current predefined number of frames with a stable image of the parking space of the previous predefined number of frames of the parking space, determine a detection result of the parking space as the detection result of the parking space of the previous predefined number of frames when a comparison result is that they are similar, and judge whether the parking space satisfies a feature of an available parking space according to a contour in the stable image of the parking space of the current predefined number of frames when the comparison result is that they are not similar; a first processing unit configured to, when the parking space satisfies the feature of an available parking space, determine the detection result of the parking space as an available parking space, detect whether a current scenario is clear when the parking space does not satisfy the feature of an available parking space, and perform clearing processing on the stable image of the parking space of the current predefined number of frames when the current scenario is not clear; and a third detecting unit configured to detect the stable image of the parking space by using a machine learning method, to obtain the detection result of the parking space.

According to a second aspect of embodiments of the present disclosure, there is provided electronic equipment, including the parking space detection apparatus described in the first aspect of embodiments of the present disclosure.

According to a third aspect of embodiments of the present disclosure, there is provided a parking space detection method, which detects monitoring videos of a parking lot one by one taking images of a predefined number of frames as a unit, the method including: in detecting each image of a predefined number of frames, for a parking space having motion information within a current predefined number of frames, determining a detection result of the parking space as a detection result of the parking space of a previous predefined number of frames; and in detecting each images of a predefined number of frames, detecting images one by one of a parking space having no motion information within the current predefined number of frames; wherein, the in detecting each images of a predefined number of frames, detecting images one by one of a parking space having no motion information within the current predefined number of frames, includes: in detecting each images of the parking space having no motion information within the current predefined number of frames, comparing a stable image of the parking space of the current predefined number of frames with a stable image of the parking space of the previous predefined number of frames, determining a detection result of the parking space as the detection result of the parking space of the previous predefined number of frames when a comparison result is that they are similar, and judging whether the parking space satisfies a feature of an available parking space according to a contour in the stable image of the parking space of the current predefined number of frames when the comparison result is that they are not similar; when the parking space satisfies the feature of an available parking space, determining the detection result of the parking space as an available parking space, detecting whether a current scenario is clear when the parking space does not satisfy a feature of an available parking space, and performing clearing processing on the stable image of the parking space of the current predefined number of frames when the current scenario is not clear; and detecting the stable image of the parking space by using a machine learning method, to obtain the detection result of the parking space.

An advantage of embodiments of the present disclosure exists in that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high; and furthermore, performing the detection based on a stable image may suppress random noises, and improve the detection precision.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

Figure 1:
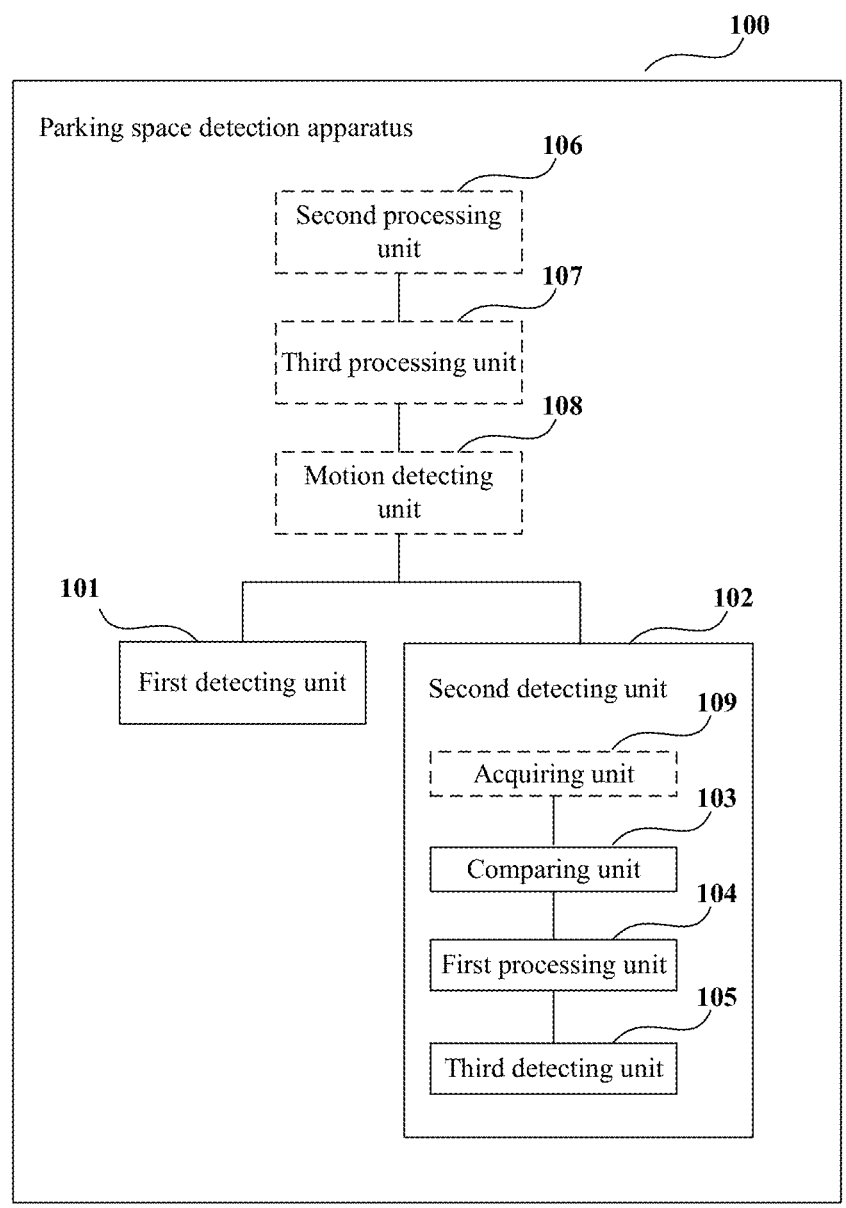
FIG. 1 is a schematic diagram of the parking space detection apparatus of Embodiment 1 of the present disclosure.

Reference will now be made in detail to the embodiments, examples of which are illustrated in the accompanying drawings, wherein like reference numerals refer to the like elements throughout. The embodiments are described below to explain the present invention by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

FIG. 1 is a schematic diagram of the parking space detection apparatus of Embodiment 1 of the present disclosure. As shown in FIG. 1, the parking space detection apparatus 100 detects or performs monitoring of videos of a parking lot one by one taking images of a predefined number of frames as a unit, the apparatus including:

a first detecting unit 101 configured to, in detecting each image of a predefined number of frames, for a parking space having motion information within a current predefined number of frames, determine a detection result of the parking space as a detection result of the parking space of a previous predefined number of frames; and a second detecting unit 102 configured to, in detecting each image of a predefined number of frames, detect images one by one of a parking space having no motion information within the current predefined number of frames;

wherein, the second detecting unit 102 includes:

a comparing unit 103 configured to, in detecting each image of the parking space having no motion information within the current predefined number of frames, compare a stable image of the parking space of the current predefined number of frames with a stable image of the parking space of the previous predefined number of frames, determine a detection result of the parking space as the detection result of the parking space of the previous predefined number of frames when a comparison result is that they are similar, and judge whether the parking space satisfies a feature of an available parking space according to a contour in the stable image of the parking space of the current predefined number of frames when the comparison result is that they are not similar;

a first processing unit 104 configured to, when the parking space satisfies the feature of an available parking space, determine the detection result of the parking space as an available parking space, detect whether a current scenario is clear when the parking space does not satisfy the feature of an available parking space, and perform clearing processing on the stable image of the parking space of the current predefined number of frames when the current scenario is not clear; and a third detecting unit 105 configured to detect the stable image of the parking space by using a machine learning method, to obtain the detection result of the parking space.

It can be seen from the above embodiment that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high; and furthermore, performing the detection based on the stable image may suppress random noises, and improve the detection precision.

In this embodiment, the monitoring videos of the parking lot may be obtained by using an existing method, such as being obtained by providing a video camera over the parking lot.

In this embodiment, the predefined number of frames may be set according to an actual situation. In this example, the predefined number of frames is L. For example, when the number of frames of the monitoring video propagated per second is 25, L may be set to be 100, that is, video images within four seconds are taken.

In this embodiment, the first detecting unit 101 is configured to, in detecting each image of a predefined number of frames, for a parking space having motion information within a current predefined number of frames, determine a detection result of the parking space as a detection result of the parking space of a previous predefined number of frames.

In this embodiment, in detecting each image of a predefined number of frames, for a parking space having motion information within a current predefined number of frames, the first detecting unit 101 determines the detection result of the parking space as the detection result of the parking space of the previous predefined number of frames. For example, when the detection result of the parking space of the previous predefined number of frames is "an available parking space", at the current predefined number of frames, the detection result of the parking space is kept as "an available parking space"; and when the detection result of the parking space of the previous predefined number of frames is "an unavailable parking space", at the current predefined number of frames, the detection result of the parking space is kept as "an unavailable parking space".

In detecting each image of a predefined number of frames, the second detecting unit 102 detects images one by one of the parking space having no motion information within the current predefined number of frames.

A method for detecting a motion status of a parking space within a predefined number of frames of this embodiment shall be illustrated below.

For example, the apparatus 100 may further include:

a second processing unit 106 configured to average each N frames of images in the current L frames of images, to obtain M average value frames, L=M*N, and L, M and N being positive integers;

a third processing unit 107 configured to differentiate the M average value frames one by one, and perform binarization processing based on a differentiation result, to obtain an image related to motion information of the current L frames of images; and a motion detecting unit 108 configured to detect motion statuses of parking spaces within the current L frames according to the image related to motion information of the current L frames of images.

In this embodiment, the second processing unit 106, the third processing unit 107 and the motion detecting unit 108 are optional, and are shown in FIG. 1 by dashed boxes.

In this embodiment, descriptions shall be given taking L=100, M=4 and N=25 as an example.

The second processing unit 106 averages each 25 frames of images in the current 100 frames of images, to obtain 4 average value frames. For example, an existing method may be used for the averaging processing.

Figure 2:
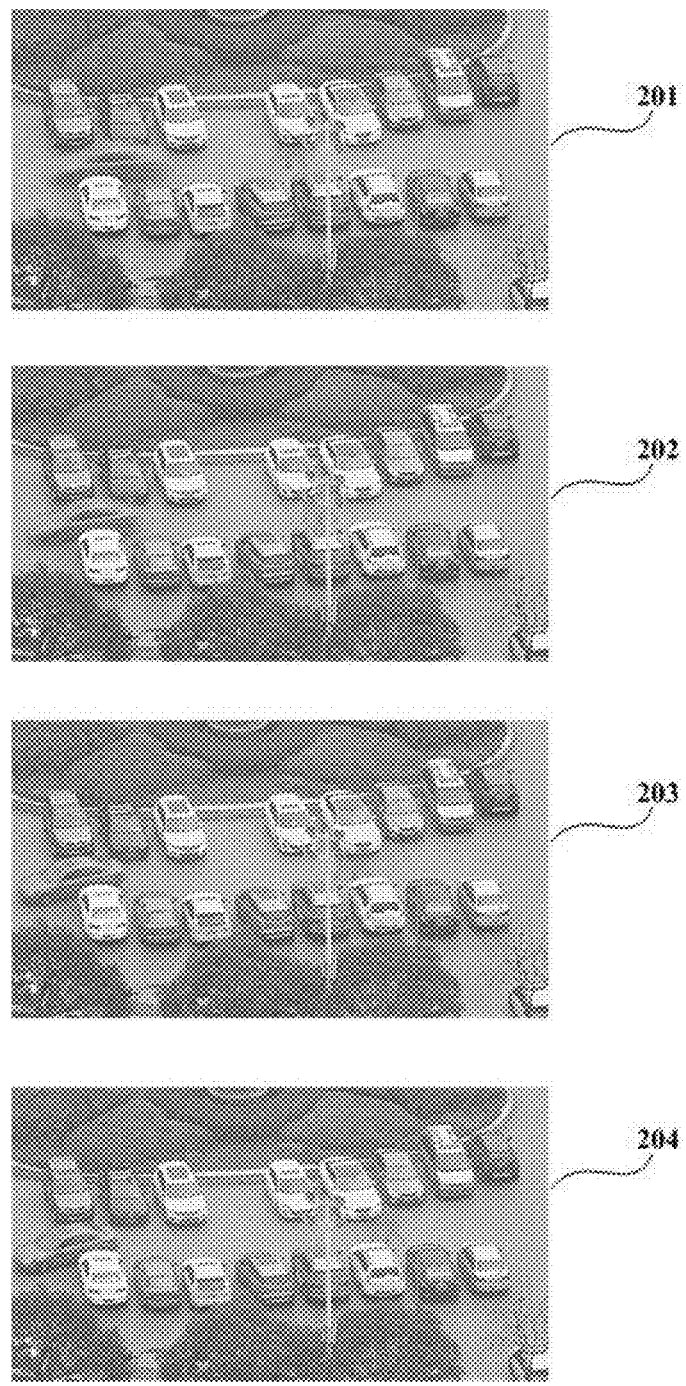
FIG. 2 are images of four average value frames of a current L frame of Embodiment 1 of the present disclosure.

FIG. 2 provides images for four average value frames of a current L frame of Embodiment 1 of the present disclosure. As shown in FIG. 2, the four average value frames of images are denoted by 201-204 in turn. The third processing unit 107 differentiates the 4 average value frames one by one, and perform binarization processing based on the differentiation result, to obtain the image related to motion information of the current 100 frames of images. For example, existing methods may be used for differentiating the 4 average value frames one by one and performing binarization processing based on the differentiation result, to obtain the image related to motion information.

Figure 3:
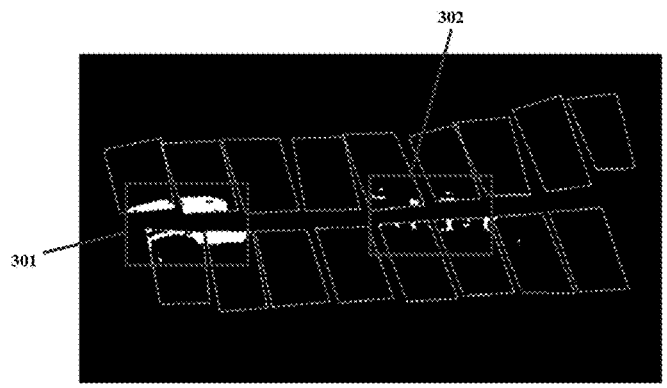
FIG. 3 is an image related to motion information of the current L frame of Embodiment 1 of the present disclosure.

FIG. 3 is an image related to motion information of the current L frame of Embodiment 1 of the present disclosure. As shown in FIG. 3, 8 parking spaces having motion information are denoted by two frames 301 and 302, and other parking spaces have no motion information.

In this embodiment, the motion detecting unit 108 detects the motion statuses of the parking spaces within the current L frames according to the image related to motion information. For example, the 8 parking spaces framed in FIG. 3 are determined as having motion information within the current 100 frames, and the other parking spaces are determined as having no motion information within the current 100 frames.

In this embodiment, the second detecting unit 102 detects images one by one of the parking space having no motion information within the current predefined number of frames.

In this embodiment, the comparing unit 103 in the second detecting unit 102 is configured to, in detecting each image of the parking space having no motion information within the current predefined number of frames, compare a stable image of the parking space of the current predefined number of frames with a stable image of the parking space of the previous predefined number of frames, determine a detection result of the parking space as the detection result of the parking space of the previous predefined number of frames when a comparison result is that they are similar, and judge whether the parking space satisfies a feature of an available parking space according to a contour in the stable image of the parking space of the current predefined number of frames when the comparison result is that they are not similar.

In this embodiment, the stable image refers to a preprocessed video image. For example, a stable image of a current predefined number of frames refers to an image of an average value frame obtained by averaging the frames of images of the current predefined number of frames. Random noises may be efficiently suppressed by preprocessing video images, such as averaging processing. And furthermore, the embodiment of the present disclosure may preprocess a video image in other manners, only when random noises may be suppressed.

A method for obtaining a stable image of this embodiment shall be illustrated below.

For example, the second detecting unit may further include an acquiring unit 109 configured to, in detecting each image of the parking space having no motion information within the current predefined number of frames, average the images of the parking space of the current predefined number of frames, to obtain the stable image of the parking space of the current predefined number of frames.

In this embodiment, the acquiring unit 109 is optional, and is shown in FIG. 1 by dash boxes.

In this embodiment, an existing method may be used to average the images of the current predetermined number of frames of the parking space. For example, images of L frames may be directly averaged, or M average value frames of images may be averaged after the second processing unit 106 obtains the M average value frames.

Figure 4:
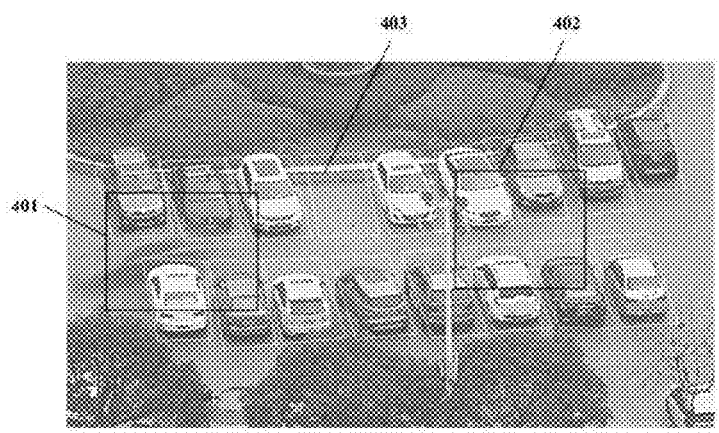
FIG. 4 is a stable status detection image of the current L frame of Embodiment 1 of the present disclosure.
Figure 5:
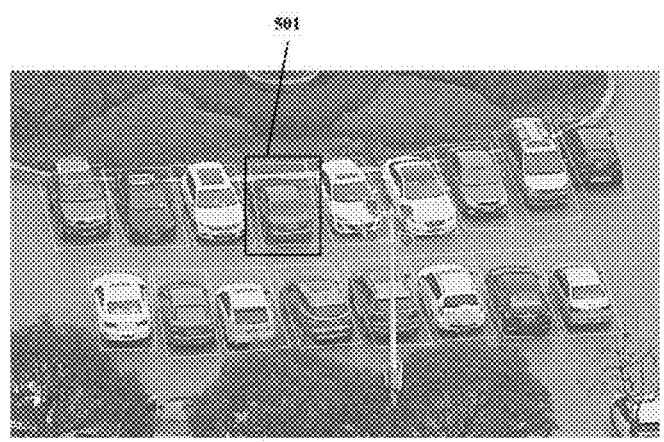
FIG. 5 is a stable status detection image of a previous L frame of Embodiment 1 of the present disclosure.

FIG. 4 is a stable status detection image (i.e. a stable image) of the current L frame of Embodiment 1 of the present disclosure, and FIG. 5 is a stable status detection image of a previous L frame of Embodiment 1 of the present disclosure. As shown in FIG. 4, as the 8 parking spaces in the frames 401 and 402 (corresponding to the 8 parking spaces framed in FIG. 3) have motion information, it may be directly deemed that their parking space statuses are not changed relative to the previous L frames, and the rest of the parking spaces are detected one by one. For example, the stable status detection image of the parking space in frame 501 is changed much relative to the stable status detection image of the corresponding parking space 403 in the current L frames, thus it is judged that they are not similar, and judge whether the parking space satisfies a feature of an available parking space according to a contour of the parking space 403; and for the rest of the parking spaces, it may be directly deemed that their parking space statuses are not changed relative to the previous L frame.

Figure 6:
FIG. 6 is a contour image of the stable status detection image of the current L frame of Embodiment 1 of the present disclosure.

In this embodiment, an existing method may be used for obtaining a contour of a parking space, for example, threshold processing is performed after an operation is performed by using a Sobel algorithm. FIG. 6 is a contour image of the stable status detection image of the current L frame of Embodiment 1 of the present disclosure.

After the contour of the parking space is obtained, when the parking space satisfies the feature of an available parking space, the first processing unit 104 determines the detection result of the parking space as an available parking space, detect whether a current scenario is clear when the parking space does not satisfy the feature of an available parking space, and perform clearing processing on the stable image of the parking space of the current predefined number of frames when the current scenario is not clear.

In this embodiment, an existing method may be used for judging whether the parking space satisfies the feature of an available parking space. For example, contour information on the parking space is obtained first. For example, an original size of the parking space may be appropriately reduced inward by a part, to eliminate influence of the frame of the parking space and views of surrounding vehicles. The contour information may include, for example, the number and distribution orientations of contour points, lengths and orientations of straight lines, and positions of feature points, etc., and whether the parking space satisfies the feature of an available parking space is judged according to the contour information.

In this embodiment, an existing method may be used for detecting whether a current scenario is clear. For example, whether surrounding luminance of the current scenario is relatively dark, or fog, is detected.

When the current scenario is not clear, the first processing unit 104 performs clearing processing on the stable image of the parking space of the current predefined number of frames. For example, image enhancement or defogging processing is performed according to the detection result, to obtain a clear stable image. Hence, it is applicable to various scenarios.

In this embodiment, when the current scenario is clear, the first processing unit 104 directly inputs the stable image to the third detecting unit 105 for detection. And when the current scenario is not clear, the first processing unit 104 performs clearing processing on the stable image, and then inputs the clearing processed stable image to the third detecting unit 105 for detection.

In this embodiment, the third detecting unit 105 detects the stable image of the parking space by using a machine learning method, to obtain the detection result of the parking space. In this embodiment, an existing machine learning method may be used. For example, an existing support vector machine (SVM) algorithm or a combined classification algorithm (Adaboost algorithm) may be used to classify based on a classifier obtained by training, to determine whether the detection result of the parking space is "an available parking space" or "an unavailable parking space".

It can be seen from the above embodiment that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high.

Embodiment 2

Figure 7:
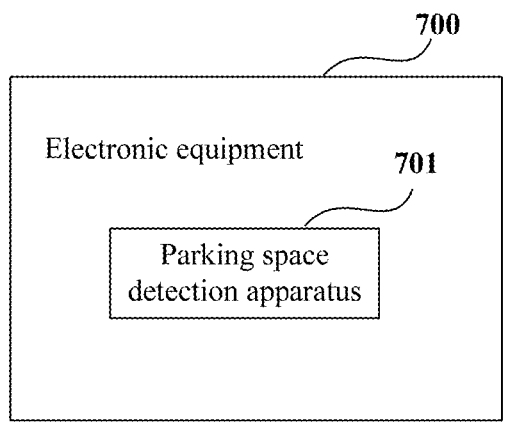
FIG. 7 is a schematic diagram of the electronic equipment of Embodiment 2 of the present disclosure.

An embodiment of the present disclosure further provides electronic equipment. FIG. 7 is a schematic diagram of a structure of the electronic equipment of Embodiment 2 of the present disclosure. As shown in FIG. 7, the electronic equipment 700 includes a parking space detection apparatus 701. In this embodiment, a structure and functions of the parking space detection apparatus 701 are identical to those contained in Embodiment 1, and shall not be described herein any further.

Figure 8:
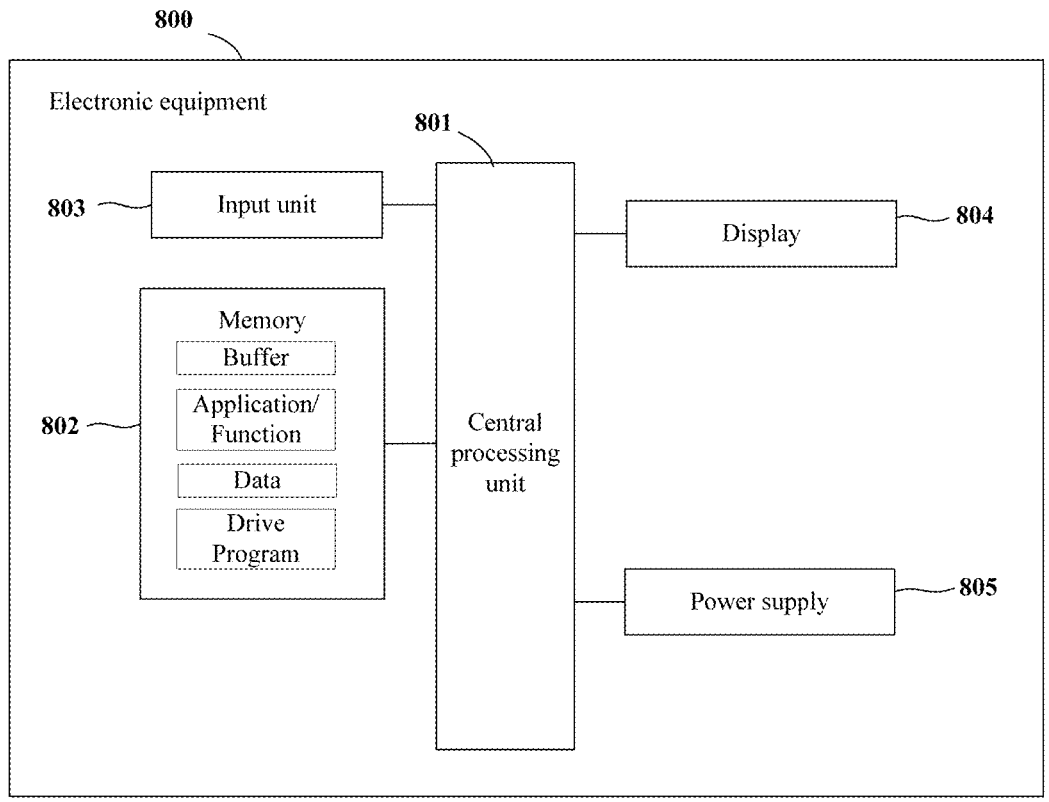
FIG. 8 is a block diagram of a systematic structure of the electronic equipment of Embodiment 2 of the present disclosure.

FIG. 8 is a block diagram of a systematic structure of the electronic equipment of Embodiment 2 of the present disclosure. As shown in FIG. 8, the electronic equipment 800 may include a central processing unit 801 (or computer) and a memory 802, the memory 802 being coupled to the central processing unit 801. This figure is illustrative only, and other types of structures may also be used, to supplement or replace this structure and achieve telecommunications function or other functions.

As shown in FIG. 8, the electronic equipment 800 may further include an input unit 803, a display 804, and a power supply 805.

In an implementation, the functions of the parking space detection apparatus described in Embodiment 1 may be integrated into the central processing unit 801. For example, the central processing unit 801 may be configured to: in detecting each image of a predefined number of frames, for a parking space having motion information within a current predefined number of frames, determine a detection result of the parking space as a detection result of the parking space of a previous predefined number of frames; and in detecting each image of a predefined number of frames, detect images one by one of a parking space having no motion information within the current predefined number of frames; the in detecting each image of a predefined number of frames, detecting images one by one of a parking space having no motion information within the current predefined number of frames, includes: in detecting each images of the parking space having no motion information within the current predefined number of frames, comparing a stable image of the parking space of the current predefined number of frames with a stable image of the parking space of the previous predefined number of frames, determining a detection result of the parking space as the detection result of the parking space of the previous predefined number of frames when a comparison result is that they are similar, and judging whether the parking space satisfies a feature of an available parking space according to a contour in the stable image of the parking space of the current predefined number of frames when the comparison result is that they are not similar; when the parking space satisfies the feature of an available parking space, determining the detection result of the parking space as an available parking space, detecting whether a current scenario is clear when the parking space does not satisfy a feature of an available parking space, and performing clearing processing on the stable image of the parking space of the current predefined number of frames when the current scenario is not clear; and detecting the stable image of the parking space by using a machine learning method, to obtain the detection result of the parking space.

For example, the predefined number of frames is L, and the central processing unit 801 may further be configured to: average each N frames of images in the current L frames of images, to obtain M average value frames, L=M*N, and L, M and N being positive integers; differentiate the M average value frames one by one, and perform binarization processing based on a differentiation result, to obtain an image related to motion information of the current L frames of images; and detect motion statuses of parking spaces within the current L frames according to the image related to motion information of the current L frames of images.

For example, the in detecting each image of a predefined number of frames, detecting images one by one of a parking space having no motion information within the current predefined number of frames, further includes: in detecting each image of the parking space having no motion information within the current predefined number of frames, averaging the images of the parking space of the current predefined number of frames, to obtain the stable image of the parking space of the current predefined number of frames.

In another implementation, the parking space detection apparatus described in Embodiment 1 and the central processing unit 801 may be configured separately. For example, the parking space detection apparatus may be configured as a chip connected to the central processing unit 801, with its functions being realized under control of the central processing unit 801

In this embodiment, the electronic equipment 800 does not necessarily include all the parts shown in FIG. 8.

As shown in FIG. 8, the central processing unit 801 is sometimes referred to as a controller or control, and may include a microprocessor or other processor devices and/or logic devices. The central processing unit 801 receives input and controls operations of every components of the electronic equipment 800.

The memory 802 may be, for example, one or more of a buffer memory, a flash memory, a hard drive, a mobile medium, a volatile memory, a nonvolatile memory, or other suitable devices, which may store programs executing related information. And the central processing unit 801 may execute the programs stored in the memory 802, to realize information storage or processing, etc. Functions of other parts are similar to those of the prior art, which shall not be described herein any further. The parts of the electronic equipment 800 may be realized by specific hardware, firmware, software, or any combination thereof, without departing from the scope of the present disclosure.

It can be seen from the above embodiment that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high.

Embodiment 3

Figure 9:
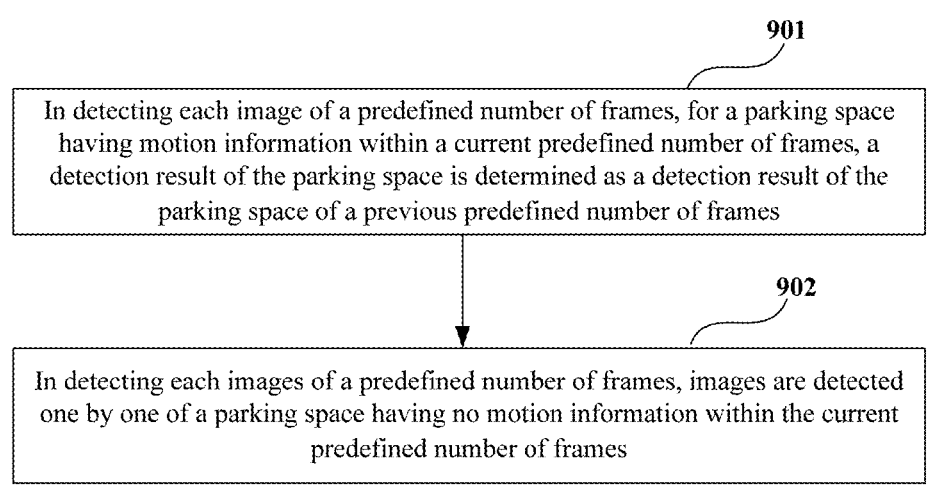
FIG. 9 is a flowchart of the parking space detection method of Embodiment 3 of the present disclosure.

An embodiment of the present disclosure further provides a parking space detection method, which detects monitoring videos of a parking lot one by one taking images of a predefined number of frames as a unit, and which corresponds to the parking space detection apparatus of Embodiment 1. FIG. 9 is a flowchart of the parking space detection method of Embodiment 3 of the present disclosure. As shown in FIG. 9, the method includes:

Step 901: in detecting each image of a predefined number of frames, for a parking space having motion information within a current predefined number of frames, a detection result of the parking space is determined as a detection result of the parking space of a previous predefined number of frames; and Step 902: in detecting each images of a predefined number of frames, images are detected one by one of a parking space having no motion information within the current predefined number of frames.

Figure 10:
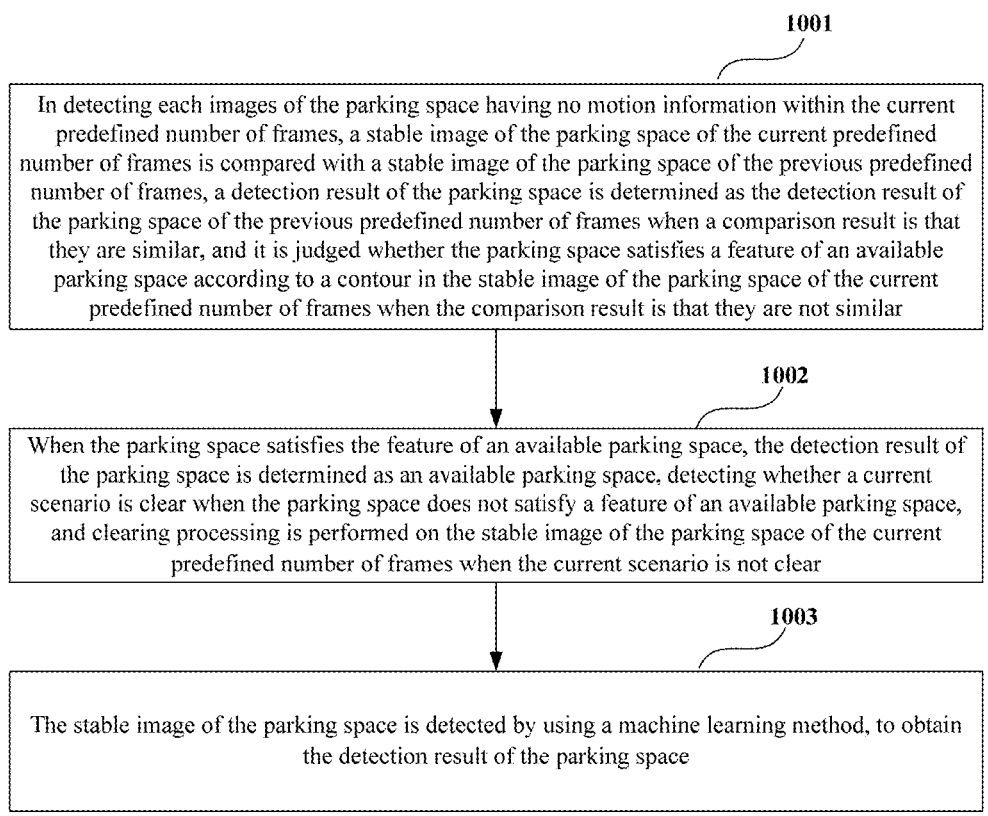
FIG. 10 is a flowchart of step 902 in FIG. 9 of Embodiment 3 of the present disclosure.

FIG. 10 is a flowchart of step 902 in FIG. 9 of Embodiment 3 of the present disclosure, the method includes:

Step 1001: in detecting each images of the parking space having no motion information within the current predefined number of frames, a stable image of the parking space of the current predefined number of frames is compared with a stable image of the parking space of the previous predefined number of frames, a detection result of the parking space is determined as the detection result of the parking space of the previous predefined number of frames when a comparison result is that they are similar, and it is judged whether the parking space satisfies a feature of an available parking space according to a contour in the stable image of the parking space of the current predefined number of frames when the comparison result is that they are not similar;

Step 1002: when the parking space satisfies the feature of an available parking space, the detection result of the parking space is determined as an available parking space, detecting whether a current scenario is clear when the parking space does not satisfy a feature of an available parking space, and clearing processing is performed on the stable image of the parking space of the current predefined number of frames when the current scenario is not clear; and Step 1003: the stable image of the parking space is detected by using a machine learning method, to obtain the detection result of the parking space.

In this embodiment, a method for judging a motion status, a method for obtaining the stable image, a method for judging whether it is an available parking space according to a contour, a method for performing clearness detection on the stable image, a method for performing clearing processing on the stable image and a method for detecting the stable image of the parking space by using a machine learning method are identical to those contained in Embodiment 1, and shall not be described herein any further.

It can be seen from the above embodiment that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high.

Embodiment 4

Figure 11:
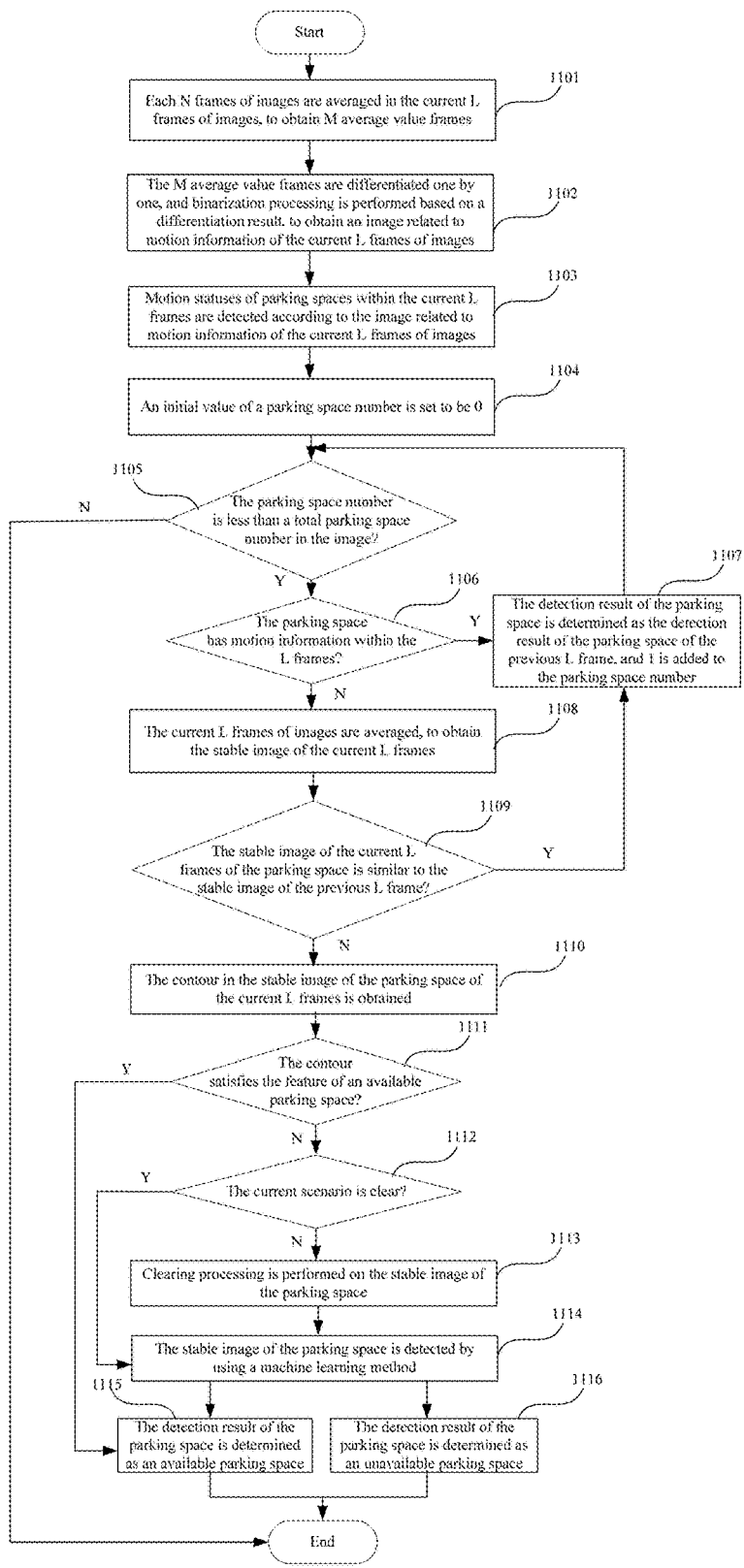
FIG. 11 is a flowchart of the parking space detection method of Embodiment 4 of the present disclosure.

An embodiment of the present disclosure further provides a parking space detection method, which detects monitoring videos of a parking lot one by one taking images of L frames as a unit, and which corresponds to the parking space detection apparatus of Embodiment 1. FIG. 11 is a flowchart of the parking space detection method of Embodiment 4 of the present disclosure. As shown in FIG. 11, the method includes:

Step 1101: each N frames of images are averaged in the current L frames of images, to obtain M average value frames, L=M*N, and L, M and N being positive integers;

Step 1102: the M average value frames are differentiated one by one, and binarization processing is performed based on a differentiation result, to obtain an image related to motion information of the current L frames of images;

Step 1103: motion statuses of parking spaces within the current L frames are detected according to the image related to motion information of the current L frames of images;

Step 1104: an initial value of a parking space number is set to be 0;

Step 1105: it is judged whether the parking space number is less than a total parking space number in the image, entering into step 1106 when a result of judgment is "yes", and terminating the processing when the result of judgment is "no";

Step 1106: it is judged whether the parking space has motion information within the L frames, entering into step 1107 when a result of judgment is "yes", and entering into step 1108 when the result of judgment is "no";

Step 1107: the detection result of the parking space is determined as the detection result of the parking space of the previous L frame, and 1 is added to the parking space number;

Step 1108: the current L frames of images are averaged, to obtain the stable image of the current L frames;

Step 1109: it is judged whether the stable image of the current L frames of the parking space is similar to the stable image of the previous L frame, entering into step 1107 when a result of judgment is "yes", and entering into step 1110 when the result of judgment is "no";

Step 1110: the contour in the stable image of the parking space of the current L frames is obtained;

Step 1111: it is judged whether the contour satisfies the feature of an available parking space, entering into step 1115 when a result of judgment is "yes", and entering into step 1112 when the result of judgment is "no";

Step 1112: it is judged whether the current scenario is clear, entering into step 1114 when a result of judgment is "yes", and entering into step 1113 when the result of judgment is "no";

Step 1113: clearing processing is performed on the stable image of the parking space;

Step 1114: the stable image of the parking space is detected by using a machine learning method;

Step 1115: the detection result of the parking space is determined as an available parking space; and Step 1116: the detection result of the parking space is determined as an unavailable parking space.

In this embodiment, the methods used in the above steps are identical to those contained in Embodiment 1, and shall not be described herein any further.

It can be seen from the above embodiment that detection is performed based on motion statuses of images of parking spaces, thereby ensuring stability of the detection result; detection is performed by combining a contour method and a machine learning method, and clearing processing is performed before using the machine learning method when a scenario is unclear, to efficiently use advantages of the contour method and the machine learning method, with the processing speed being relatively fast and being applicable to various scenarios, and the detection precision is relatively high.

An embodiment of the present disclosure provides a computer-readable program, when the program is executed in a parking space detection apparatus or electronic equipment, the program enables the computer to carry out the parking space detection method as described in Embodiment 3 or 4 in the parking space detection apparatus or the electronic equipment.

An embodiment of the present disclosure further provides a non-transitory computer readable storage medium in which a computer-readable program is stored, the computer-readable program enables the computer to carry out the parking space detection method as described in Embodiment 3 or 4 in a parking space detection apparatus or electronic equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to non-transitory computer readable a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A parking space detection apparatus, which monitors videos of a parking lot one by one using images of a predefined number of frames as a unit, the apparatus comprising:
   a first detecting unit configured to, in detecting each image of the predefined number of frames, for a parking space having motion information within a current predefined number of frames, determine a detection result of the parking space as a detection result of the parking space of the previous predefined number of frames; and
   a second detecting unit configured to, in detecting each image of the predefined number of frames, detect images one by one of the parking space having no motion information within the current predefined number of frames;
   wherein, the second detecting unit comprises:
   a comparing unit configured to, in detecting each image of the parking space having no motion information within the current predefined number of frames, compare a current stable image of the parking space of the current predefined number of frames with a previous stable image of the parking space of the previous predefined number of frames, determine a detection result for the parking space as the detection result of the parking space of the previous predefined number of frames when a comparison result is that parking spaces are similar, and judge whether the parking space satisfies a feature of an available parking space according to a contour in the current stable image of the parking space of the current predefined number of frames when the comparison result is that parking spaces are not similar;
   a first processing unit configured to, when the parking space satisfies the feature of the available parking space, determine the detection result of the parking space as the available parking space, detect whether a current scenario is clear when the parking space does not satisfy the feature of the available parking space, and perform clearing processing on the current stable image of the parking space of the current predefined number of frames when the current scenario is not clear; and
   a third detecting unit configured to detect the current stable image of the parking space by using a machine learning method, to obtain the detection result of the parking space.

2. The apparatus according to claim 1, wherein the predefined number of frames is L, and the apparatus further comprises:
   a second processing unit configured to average each N frames of images in the current L frames of images, to obtain M average value frames, L=M*N, and L, M and N being positive integers;
   a third processing unit configured to differentiate the M average value frames one by one, and perform binarization processing based on a differentiation result, to obtain a motion image related to motion information of the current L frames of images; and
   a motion detecting unit configured to detect motion statuses of parking spaces within the current L frames according to the motion image related to motion information of the current L frames of images.

3. The apparatus according to claim 1, wherein the second detecting unit further comprises:
   an acquiring unit configured to, in detecting each image of the parking space having no motion information within the current predefined number of frames, average images of the parking space of the current predefined number of frames, to obtain the current stable image of the parking space of the current predefined number of frames.

4. Electronic equipment, comprising the apparatus as claimed in claim 1.

5. A parking space detection method, which monitors videos of a parking lot one by one using images of a predefined number of frames as a unit, the method comprising:
   in detecting each image of a predefined number of frames, for a parking space having motion information within a current predefined number of frames, determining a detection result of the parking space as a detection result of the parking space of a previous predefined number of frames; and in detecting each images of the predefined number of frames, detecting images one by one of the parking space having no motion information within the current predefined number of frames;

wherein, the in detecting each image of the predefined number of frames, detecting images one by one of the parking space having no motion information within the current predefined number of frames, comprises:

in detecting each image of the parking space having no motion information within the current predefined number of frames, comparing a current stable image of the parking space of the current predefined number of frames with a previous stable image of the parking space of the previous predefined number of frames, determining a detection result for the parking space as the detection result of the parking space of the previous predefined number of frames when a comparison result is that parking spaces are similar, and judging whether the parking space satisfies a feature of an available parking space according to a contour in the current stable image of the parking space of the current predefined number of frames when the comparison result is that parking spaces are not similar;

when the parking space satisfies the feature of the available parking space, determining the detection result of the parking space as the available parking space, detecting whether a current scenario is clear when the parking space does not satisfy the feature of the available parking space, and performing clearing processing on the current stable image of the parking space of the current predefined number of frames when the current scenario is not clear; and detecting the current stable image of the parking space by using a machine learning method, to obtain the detection result of the parking space.

6. The method according to claim 5, wherein the predefined number of frames is L, and the method further comprises:

averaging each N frames of images in the current L frames of images, to obtain M average value frames, L=M*N, and L, M and N being positive integers;

differentiating the M average value frames one by one, and performing binarization processing based on a differentiation result, to obtain a motion image related to motion information of the current L frames of images; and detecting motion statuses of parking spaces within the current L frames according to the motion image related to motion information of the current L frames of images.

7. The method according to claim 5, wherein the in detecting each image of te predefined number of frames, detecting images one by one of the parking space having no motion information within the current predefined number of frames, further comprises:

in detecting each image of the parking space having no motion information within the current predefined number of frames, averaging the images of the parking space of the current predefined number of frames, to obtain the current stable image of the parking space of the current predefined number of frames.

8. The method of claim 5, wherein performing detection based on the current stable image suppresses random noise and improves available parking space detection precision.

9. A non-transitory computer readable medium storing a method of controlling a computer, the method comprising a parking space detection method, which monitors videos of a parking lot one by one using images of a predefined number of frames as a unit, the method comprising:

in detecting each image of a predefined number of frames, for a parking space having motion information within a current predefined number of frames, determining a detection result of the parking space as a detection result of the parking space of a previous predefined number of frames; and in detecting each images of the predefined number of frames, detecting images one by one of the parking space having no motion information within the current predefined number of frames;

wherein, the in detecting each image of the predefined number of frames, detecting images one by one of the parking space having no motion information within the current predefined number of frames, comprises:

in detecting each image of the parking space having no motion information within the current predefined number of frames, comparing a current stable image of the parking space of the current predefined number of frames with a previous stable image of the parking space of the previous predefined number of frames, determining a detection result for the parking space as the detection result of the parking space of the previous predefined number of frames when a comparison result is that parking spaces are similar, and judging whether the parking space satisfies a feature of an available parking space according to a contour in the current stable image of the parking space of the current predefined number of frames when the comparison result is that parking spaces are not similar;

when the parking space satisfies the feature of the available parking space, determining the detection result of the parking space as the available parking space, detecting whether a current scenario is clear when the parking space does not satisfy the feature of the available parking space, and performing clearing processing on the current stable image of the parking space of the current predefined number of frames when the current scenario is not clear; and detecting the current stable image of the parking space by using a machine learning method, to obtain the detection result of the parking space, wherein information of the available parking space is shared with drivers.

10. The non-transitory computer readable medium of claim 9, wherein performing detection of based on the current stable image suppresses random noise and improves available parking space precision.

11. A parking space detection apparatus, which monitors videos of a parking lot one by one using images of a predefined number of frames as a unit, the apparatus comprising:

a display; and a computer, the computer comprising:

a first detecting unit configured to, in detecting each image of the predefined number of frames, for a parking space having motion information within a current predefined number of frames, determine a detection result of the parking space as a detection result of the parking space of the previous predefined number of frames; and a second detecting unit configured to, in detecting each image of the predefined number of frames, detect images one by one of the parking space having no motion information within the current predefined number of frames;

wherein, the second detecting unit comprises:
- a comparing unit configured to, in detecting each image of the parking space having no motion information within the current predefined number of frames, compare a current stable image of the parking space of the current predefined number of frames with a previous stable image of the parking space of the previous predefined number of frames, determine a detection result for the parking space as the detection result of the parking space of the previous predefined number of frames when a comparison result is that parking spaces are similar, and judge whether the parking space satisfies a feature of an available parking space according to a contour in the current stable image of the parking space of the current predefined number of frames when the comparison result is that parking spaces are not similar;
- a first processing unit configured to, when the parking space satisfies the feature of the available parking space, determine the detection result of the parking space as the available parking space, detect whether a current scenario is clear when the parking space does not satisfy the feature of the available parking space, and perform clearing processing on the current stable image of the parking space of the current predefined number of frames when the current scenario is not clear; and
- a third detecting unit configured to detect the current stable image of the parking space by using a machine learning method, to obtain the detection result of the parking space, wherein information of the available parking space is shared with drivers via the display.

12. The apparatus of claim 11, wherein performing detection based on the current stable image suppresses random noise and improves available parking space detection precision.

* * * * *